H. MAGUNNA.
CONVERTER FOR TRANSFORMING CONTINUOUS ELECTRIC CURRENT INTO ISOCHRONOUS UNDULATORY CURRENTS.
APPLICATION FILED MAY 7, 1913. RENEWED AUG. 12, 1920.

1,359,903.

Patented Nov. 23, 1920.
4 SHEETS—SHEET 1.

Inventor
Henri Magunna
By Attys
Fraser, Turk & Myers

H. MAGUNNA.
CONVERTER FOR TRANSFORMING CONTINUOUS ELECTRIC CURRENT INTO ISOCHRONOUS UNDULATORY CURRENTS.
APPLICATION FILED MAY 7, 1913. RENEWED AUG. 12, 1920.
1,359,903.                                          Patented Nov. 23, 1920.
4 SHEETS—SHEET 2.
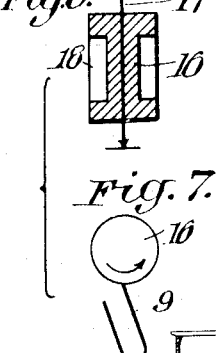
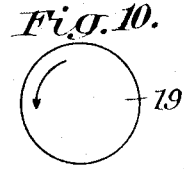
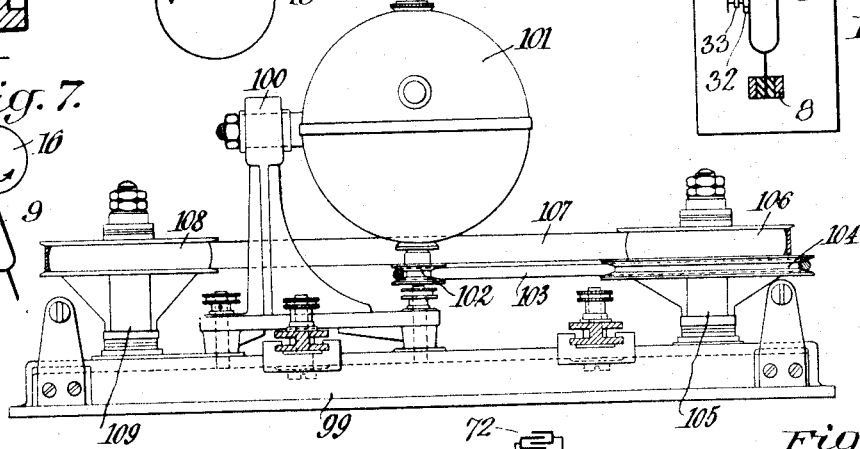
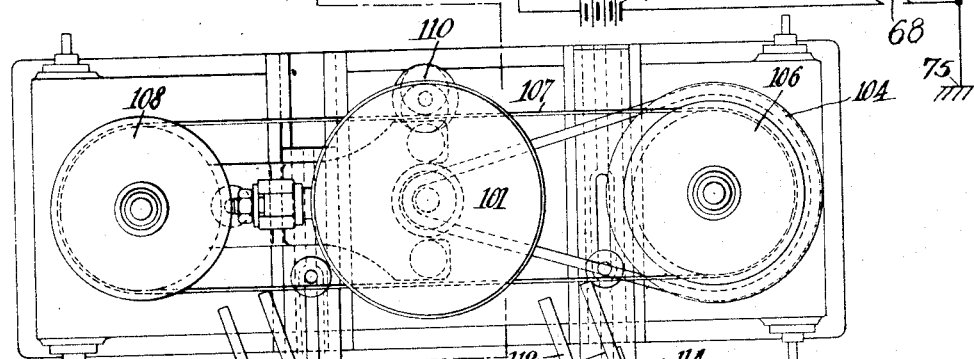
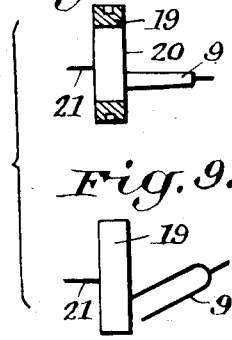
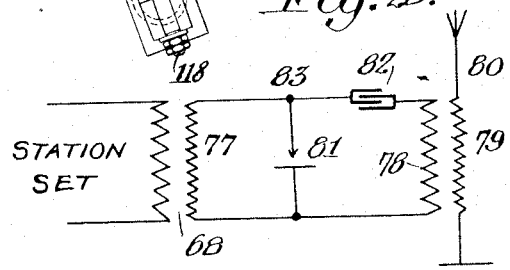
WITNESSES:
J. F. Wallace
René Bruine
INVENTOR:
Henri Magunna
By Attorneys,
Fraser, Furk & Myers H. MAGUNNA.
CONVERTER FOR TRANSFORMING CONTINUOUS ELECTRIC CURRENT INTO ISOCHRONOUS UNDULATORY CURRENTS.
APPLICATION FILED MAY 7, 1913. RENEWED AUG. 12, 1920.

1,359,903.

Patented Nov. 23, 1920.
4 SHEETS—SHEET 3.

WITNESSES:
J. F. Wallace
René Bruine

INVENTOR:
Henri Magunna,
By Attorneys,
Fraser, Turk & Myers

H. MAGUNNA.
CONVERTER FOR TRANSFORMING CONTINUOUS ELECTRIC CURRENT INTO ISOCHRONOUS UNDULATORY CURRENTS.
APPLICATION FILED MAY 7, 1913. RENEWED AUG. 12, 1920.
1,359,903.
Patented Nov. 23, 1920.
4 SHEETS—SHEET 4.
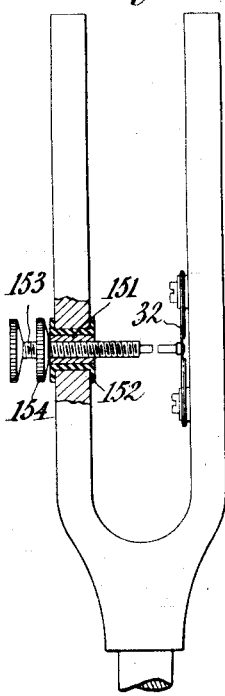
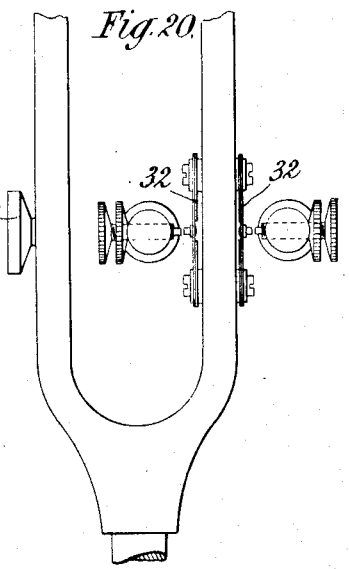
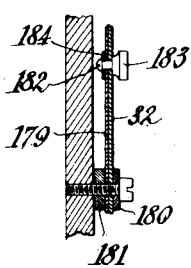
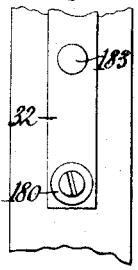
WITNESSES
J. F. Wallace
René Bruine
INVENTOR:
Henri Magunna
By Attorneys,
Fraser, Trask & Myers

UNITED STATES PATENT OFFICE.

HENRI MAGUNNA, OF PARIS, FRANCE, ASSIGNOR TO SOCIÉTÉ DES TELEGRAPHES MULTIPLEX (SYSTEME E. MERCADIER-H. MAGUNNA), OF PARIS, FRANCE.

CONVERTER FOR TRANSFORMING CONTINUOUS ELECTRIC CURRENT INTO ISOCHRONOUS UNDULATORY CURRENTS.

1,359,903. Specification of Letters Patent. Patented Nov. 23, 1920.

Application filed May 7, 1913, Serial No. 766,129. Renewed August 12, 1920. Serial No. 403,149.

*To all whom it may concern:*

Be it known that I, HENRI MAGUNNA, a citizen of the Republic of France, and residing in Paris, France, have invented certain new and useful Improvements in Converters for Transforming Continuous Electric Current into Isochronous Undulatory Currents, of which the following is a specification.

In the known converters for transforming continuous electric current into isochronous undulatory currents, the movements of the tuning forks or other vibrating bodies have been maintained electrically. They can be divided into two types, namely, (1) converters in which the maintenance of the motion and the transformation of the current are simultaneous, such as those of Varley, Paul Lacour, Elisha Gray, Mercadier, Mercadier-Magunna;

(2) Converters in which the maintenance of the motion and the transformation of the current are distinct, such as those of Paul Lacour, Mercadier, Van Ryselberghe.

The irregular action which is obtained by means of two styles or two tuning forks or with microphones (which give weak undulatory currents of very little power) has caused the latter of these two types to be given up.

Among the converters in which the transformation of the current and maintenance of the oscillation are simultaneous, the electric tuning fork of Mercadier-Magunna has given satsfactory results; it comprises an electric circuit for maintaining the vibrations and a coil in this circuit connected in parallel to the primary of an induction transformer, which is traversed by a continuous undulatory current. This system has a disadvantage, which is due to the principle on which it depends: the production of the undulatory current is a function of the strength of the current, which traverses the vibrator, and of the pressure of the style on the fixed contact. The action is consequently limited more particularly as regards the regulation of the current strength, since the electric tuning fork plays the double part of motor and transformer.

Also, the machines, which have been proposed for producing undulatory currents, and which depend upon the speed of the driving motors, cannot comply with the requirement of constant periodicity. In fact, with motors, even when provided with mechanical or electric regulators, constancy of speed cannot be maintained within 1/200th of a second, a figure which is absolutely indispensable for mechanical syntony. The statement that an apparatus has a speed constancy within 1/200th of a second means, for instance, that a tuning-fork having a normal frequency of 800 per second, can have a maximum variation of speed, more or less, by 1/200th, that is to say, that its frequency will always be embraced between 796 and 804 double vibrations per second. The maximum of variation of speed, in the case given, is 8 double vibrations. In the case of a tuning-fork having a normal frequency of 400, the maximum of variation of speed would be 4 double vibrations.

It has been found in practice that an electric tuning fork, which has been working for 12 hours, had an average constancy within 1/200th of a second, hence the satisfactory results obtained by this apparatus. For this reason it has been considered advisable to keep to the method of generating isochronous undulatory currents by vibrating rods, but to maintain perfectly separate the means for sustaining the vibrations and for the transformation of the continuous into undulatory current; and this has led to a mechanical method of maintaining the vibrations of the rods; which is the object of the present invention. Under the expression vibrating rods, are included tuning forks or any other vibrating bodies of which the vibrations follow the pendulum law, that is to say are sinusoidal.

A rod or tuning fork is kept in continual vibration by placing the free end of one of its prongs in contact with a body covered with rosin, this body being displaced constantly and regularly in contact with the edge of the fork. This method can be carried out in three different ways, which are only modified constructions of the same general principle, viz., by endless bands, by cylindrical drums, and by flat disks.

The accompanying figures illustrate different methods of maintaining the vibrators in motion, details of the constructions of the contact members and of the circuits in which the vibrators, serving to convert the continuous into isochronous undulatory currents, are placed.

In said drawings,—

Fig. 6 is a vertical sectional view of a rubbing cylinder.

Fig. 7 is a plan view thereof in conjunction with a tuning fork.

Fig. 8 is a vertical sectional view of a flat rubbing disk in conjunction with a tuning-fork.

Fig. 9 is a side elevation of said parts.

Fig. 10 is a plan view of the disk shown in Fig. 8.

Fig. 11 is a plan view, with parts in section, of a tuning-fork with certain parts in conjunction therewith used for the present invention.

Fig. 12 is a side elevation, with parts in section, of the parts shown in Fig. 11.

Fig. 13 illustrates in side elevation an apparatus for sustaining the vibrations.

Fig. 15 is a plan view of the parts shown in Figs. 13 and 14.

Figs. 19 and 20 illustrate tuning-forks and contact pieces in conjunction therewith.

Fig. 21 is a detail view of the contact piece 32 shown in Fig. 19.

Fig. 22 is a plan view of said contact piece.

Figs. 25, 26 and 27 illustrate an electrical system wherein the invention is applied to wireless telegraphy or the like.

Figure 1:
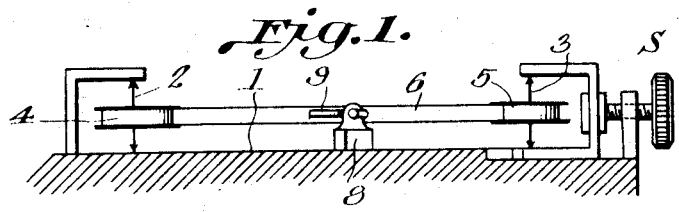
Figure 1 illustrates in side elevation, somewhat diagrammatically, and partly in section, a converter according to the present invention (the electric circuits being omitted).
Figure 2:
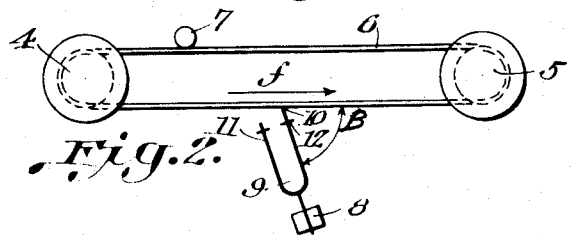
Fig. 2 is a plan view of the device shown in Fig. 1, the parts being omitted.

In Figs. 1 and 2, two vertical spindles 2 and 3, are shown, supported in a frame 1 and on these spindles are mounted two grooved pulleys 4 and 5; an endless band 6 runs in the grooves of these pulleys and the spindle 3 is driven by a mechanical method, which will be described later. The arrow $f$ (Fig. 2) shows the direction of rotation of the band. A stick of rosin 7 rubs constantly against the band 6; a tuning fork 9 is rigidly secured to a support 8 and touches the band at 10.

Figure 4:
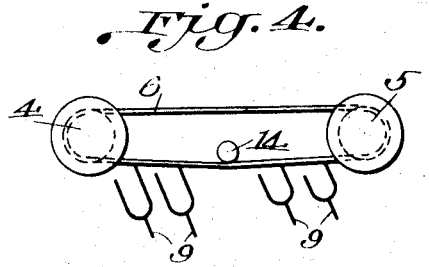
Fig. 4 illustrates the parts in somewhat the same manner as Fig. 2, a plurality of tuning-forks being shown.

As soon as the band is in motion, the tuning fork vibrates. The tuning fork carries on its prongs two movable masses 11 and 12 for adjusting the pitch. The bands used are of leather (cow or calf hide), scraped and pumiced and the skived ends are joined together by a rubber solution. Other suitable materials besides leather can be used. The tuning fork is rubbed by the belt on one of its edges 13. Several forks placed side by side can be actuated by a single band, as shown in Fig. 4, if stretching rollers 14 are placed between them, one after each pair of forks.

Figure 5:
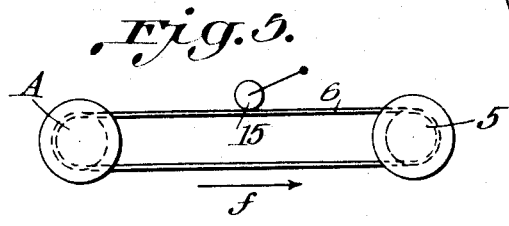
Fig. 5 is a plan view similar to Fig. 2, of certain of the parts, and showing a tension roller 15.
Figure 3:
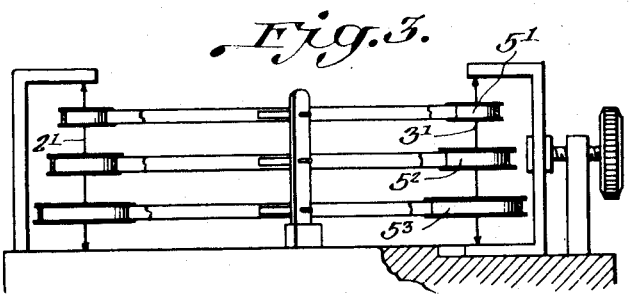
Fig. 3 is a side elevation of a spindle and pulleys which may be used in place of the spindle and pulley shown in Fig. 1.

The speed and tension of the band are both adjustable. To adjust the tension, the spindle 3 can be displaced by turning the screws $s$, Fig. 1. Also by means of a roller 15 Fig. 5 the tension can be adjusted during the action of the apparatus. The socket 8 in which the stem of the tuning-fork is fixed (Fig. 2) is grooved so that the angle $\beta$ of engagement between the prong and the band, and the pressure of the contact between them can be adjusted. It is found by experience that the same speed of engagement between the band and the fork acts perfectly through the range of an octave. The contact pressure should increase with forks of higher pitch, which is to be expected, as the forks of higher pitch are shorter and hence stiffer. When the range is greater than an octave or when forks of very high or very low pitch are used several belts can be arranged in parallel, running on pulleys of different diameter on the same spindle, and consequently having different linear velocities, as indicated by the spindles 2′ 3′ and pulleys 5′ $5^2$ $5^3$, Fig. 3. This arrangement permits of producing in different circuits currents of different frequencies, where the frequencies are more than an octave apart.

*Sustaining the vibration by cylindrical drums.*

A leather cylinder 18 is fixed on a drum 16 (Figs. 6 and 7), which is hollowed out at the center and mounted on a spindle 17; the periphery of the drum engages one of the ends of the fork 9, in the same way as the band did.

*Sustaining the vibration by flat disks.*

A leather disk 20 is stretched with adjustable tension on the drum 19 (Figs. 8, 9, 10), which is mounted on a driving spindle 21.

*Mechanical system of mounting the vibrating forks.*

The tuning forks 9 (Figs. 11 and 12) are of the type with aperiodic contacts. The contact between the movable member 32 and the fixed member 33 provided with a platinum tipped screw is always in a plane which is geometrically determined. The stem of the fork is insulated from the base and is adapted to form part of an electric connection, the other connection being the fixed terminal 33 carrying the interrupting screw. The whole is mounted on supports 35, which are bad conductors of sound (cork, caoutchouc).

The action of the vibrator is as follows:—

As soon as the rosined band is started, it sets in vibration the fork or forks which are in contact with it, and it is only necessary to adjust the position of the interrupting screw with respect to the platinized contact of the fork; the mechanical contact is established as soon as a pure note corresponding to that of the fork is heard.

Figure 14:
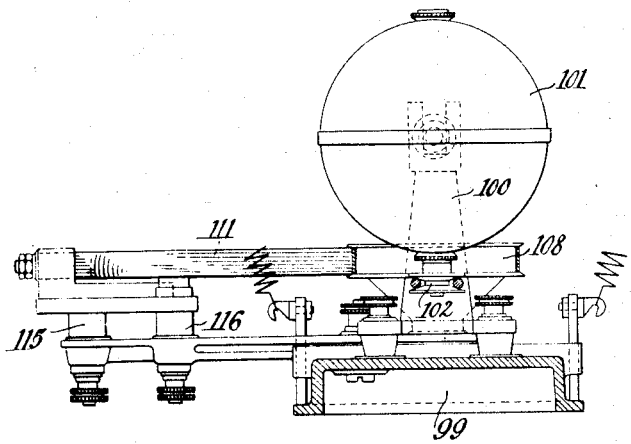
Fig. 14 is a transverse section on the line XIX—XIX, Fig. 15.

Figs. 13, 14 and 15, represent in more complete detail, a converter according to the present invention.

On the base plate 99 is mounted, in overhung bearings on the pedestal 100, a small electric motor 101 with vertical spindle, which drives, by means of a pulley 102 keyed to the lower part of its spindle and a band 103, another pulley 104 mounted on a vertical spindle 105, to which is secured a pulley 106 over which the band 107 passes. This band is in contact with the tuning forks, and also passes over another pulley 108, mounted on a vertical spindle 109. A stretching roller 110 is placed behind the band and rests on it, so as to adjust the tension; the axle of the roller is mounted on an eccentric which moves it to or from the band.

On the opposite side to the pulleys and the motor two tuning forks 111, 112, of different length, are mounted and carried on slides 113, 114, which can move in suitable guides formed in the base plate. These slides can be fixed in the positions suited to insure the desired contact between the forks 111 and 112 and the band 107. The forks are mounted on vertical axes 115 and 116, which allow the angle of engagement between the forks and the band to be varied. Each of the forks carries also at the end of the stem a terminal 117, 118 for connecting up currents and also current terminals 119, 120.

Figure 18:
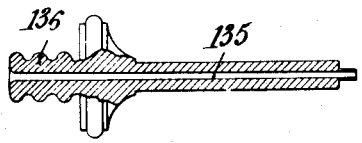
Fig. 18 illustrates a contact piece in detail.

The strength of the undulatory current can be increased either by arranging several contacts on the same vibrator and by placing on the supports of the fork the same number of interrupting screws, or in the case where there is only a single contact, perforating the interrupting screw axially, as shown in Fig. 18, so as to be able to inject a current of air from a blower coupled to the junction 136.

Figure 16:
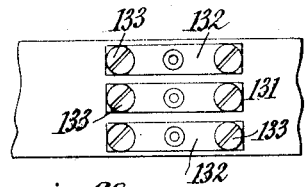
Fig. 16 illustrates a detail of the contacts upon the tuning-fork.

Fig. 16 is a part view of the side of a tuning fork showing three contacts 131. These contacts are preferably mounted on small metallic strips 132 fastened by two screws 133 to one prong of a tuning fork and are so proportioned that they have no natural period of their own and are held between metal washers, of aluminium for example.

Figure 17:
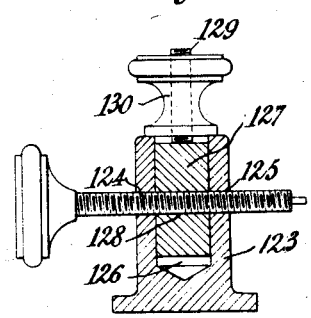
Fig. 17 illustrates a detail of the circuit terminal which is located on the base.

The interrupting screws 121, 122 can be adjusted, and fixed in position so as to regulate their distance from the strip carried by the forks, by means of a special mounting shown in vertical section in Fig. 17. This arrangement consists of a pillar 123 provided with two screwed holes 124, 125 and a vertical hole in which a cylindrical piece 127 can be frictionally displaced. This cylindrical piece has an aperture of the same diameter and screwed to the same pitch as the holes 124, 125 and is provided with a screwed stem 129, with which engages a milled headed nut 130, resting on the annular end of the pillar 123. When the cylindrical piece 127 is pulled upward by the nut 130, the screw 121 is tightened more or less and may be completely jammed without the need of any lock nut.

The terminal for leading the current in the mechanically sustained tuning forks can, instead of being mounted on the side of one of the prongs, consist, as shown in Fig. 19, of a copper bush 151 which is placed inside a second insulating bush 152 in a corresponding aperture formed in the fork, and is internally screw-threaded so as to permit of the adjustment of the regulating screw 153, which can be held in position by the lock nut 154. This screw is displaced, during the vibrations of the fork, relatively to the contact strip 32, which is secured to the other prong and is balanced by the counterweight 155.

This arrangement allows a double amplitude of vibration to be obtained for the same frequency, since the two prongs act together and approach or recede through distances twice as great, as when the break is effected on the side of one prong only of the fork.

In the modification shown in Fig. 20, contact strips 32 are placed on each side of one prong of a tuning fork and each is displaced relatively to a fixed terminal with a regulating screw like that shown in Fig. 19. By this arrangement a frequency twice that of the vibrating fork is obtained. A counter weight 155 is arranged as before to balance the weight of the contact strips 32 and their fastening screws.

The construction of the contact strips is shown in Figs. 21 and 22. The steel strip 32 is associated with a thin strip of copper 179 to increase the conductivity of the circuit between the contact and the screws, which secure the strip to the prong of the fork. This arrangement prevents the strip from being broken by the annealing due to the heating by the current traversing it, and allows the use of a thin elastic strip. The strip is aperiodic, that is, its vibrations are damped or opposed, partly owing to the non-corresponding relation between its nodes and the distance apart of its supports and partly to the manner in which it is placed between comparatively plastic materials, such as the aluminium washers 180 and 181.

Between the contact strip and the end 182 of the contact 183 a thin copper washer 184 is placed. The elasticity of the composite strip may be regulated by increasing or diminishing the thickness of the steel strip. It is obvious that the strip of copper may be placed above instead of beneath the steel strip.

For certain purposes the amplitude of the oscillations of the prong or other vibrator can be augmented and the contact point removed sufficiently far from the prong to enable the break to take place in an insulating medium, such as petrol, and in this way to protect the contacts from disintegration.

Figure 23:
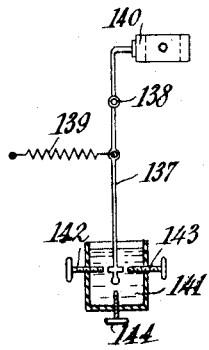
Figs. 23 and 24 illustrate in end view and side elevation, respectively, a tuning fork, and an interrupter actuated thereby.
Figure 24:
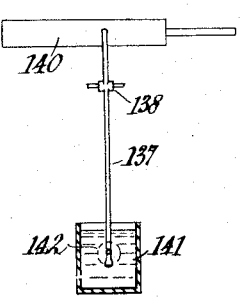

For this purpose a lever 137 as shown in Figs. 23 and 24 is arranged to oscillate about a point 138 in a plane at right angles to the plane of the prong of the tuning fork and is held against the prong by a spring 139.

The upper bent end of the lever 137 rests against the vibrating surface 140, and consequently undergoes oscillations in synchronism with this surface. The lower end carries an interrupting screw 142 immersed in a vessel 141 filled with petrol.

In this method also the frequency can be doubled by placing another screw 143 opposite the screw 142 or even quadrupled by placing a third screw 144 in an extension of the mean position of the oscillating lever 137.

*Electric oscillations especially for the purpose of wireless telegraphy.*—This system of converting continuous current into isochronous undulatory currents can be utilized not only in ordinary line telegraphy but also in any other applications, which require an isochronous interrupter, for example in the generation of electric oscillations, more especially for wireless telegraphy.

To transform continuous current into electric oscillations for the purpose of wireless telegraphy two methods can be employed.

(1) Direct excitation as shown in Fig. 25.

The primary 67 of an induction coil 68 or of a transformer with closed magnetic circuit is connected by a key 69 to the contact of the fork 70 and to a source of continuous current 71. A condenser 72 absorbs the spark. When the tuning fork 70 is maintained in vibration by the band 73 it is only necessary to close the key 69 for singing sparks to traverse the air gap 74, which is connected on one side to earth 75 and on the other side to the antenna 76. The frequency of the trains of oscillations corresponds to the number of complete oscillations of the fork.

(2) Excitation by induction (Fig. 26).

In the circuit of the secondary 77 of the induction coil 68 or of a transformer with closed magnetic circuit, there is a spark gap 81, across which is placed a condenser 82 and primary coil 78; the secondary coil 79 is placed between earth and the antenna 80.

In these different arrangements the trains of oscillations may have any desired frequency by providing tuning forks of the required frequencies; in the case of four forks the arrangement would be the following:—

Figure 27:
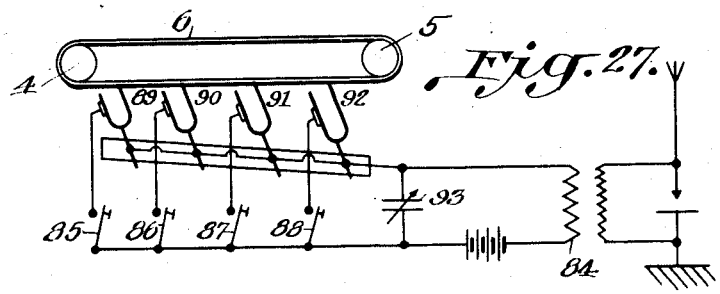

In the circuit of the primary 84 of the induction coil (Fig. 27) are inserted 4 derived circuits, each comprising keys 85—88 and tuning forks acting as vibrators 89—92, which all have one edge acted on by the same band and a condenser 93 is placed in shunt between the battery and the derived circuits.

In the case of wireless stations of small energy giving out sustained oscillations, tickers can be used for the transmission of electromagnetic waves.

I claim—

1. A device for changing a continuous current of electricity into an isochronous undulatory current, comprising an electric circuit, an isochronous vibrator acting as an interrupter in said circuit, and means for vibrating said vibrator, said means comprising an endless belt adapted to rub against said vibrator.

2. A device for changing a continuous current of electricity into an isochronous undulatory current, comprising an electric circuit, a tuning-fork acting as an interrupter in said circuit, and means for vibrating said fork, said means comprising an endless belt adapted to rub against said fork.

3. A device for changing a continuous current of electricity into an isochronous undulatory current, comprising an electric circuit, an isochronous vibrator acting as an interrupter in said circuit, and friction means with a continuous movement for maintaining in vibration said vibrator, said vibrator having a plurality of contacts, and said circuit having a plurality of corresponding contacts.

4. A device for changing a continuous current of electricity into an isochronous undulatory current, comprising an electric circuit, an isochronous vibrator acting as an interrupter in said circuit, and friction means with a continuous movement for maintaining in vibration said vibrator, said vibrator having a contact with an axial air passage therein.

5. A device for changing a continuous current of electricity into an isochronous undulatory current, comprising an electric circuit, an isochronous vibrator acting as an interrupter in said circuit, and friction means for vibrating said vibrator, said vibrator having a contact thereon and said contact comprising strips of metal having unequal vibration periods.

6. A device for changing a continuous current of electricity into an isochronous undulatory current, comprising an electric circuit, a vibrator acting as an interrupter, friction means comprising an endless belt for maintaining in vibration said vibrator, an electric motor for driving said friction means, and an independent source of current for energizing said electric motor.

7. A vibrator comprising a tuning fork, and an endless belt, adapted to rub against said tuning fork for sustaining vibrations thereof, and means whereby said tuning fork serves to transform a continuous current into an isochronous undulatory current.

In witness whereof I have hereunto signed my name in the presence of two subscribing witnesses.

HENRI MAGUNNA.

Witnesses:
 GABRIEL BELLIARD,
 LUCIEN MEMMINGER.